United States Patent [19]

Smith et al.

[11] Patent Number: 5,687,189
[45] Date of Patent: Nov. 11, 1997

[54] METHOD OF NOISE REDUCTION FOR AN ADPCM SIGNAL

[75] Inventors: Sybren D. Smith, Plantation; Paul D. Marko, Fort Lauderdale; Craig P. Wadin, Sunrise, all of Fla.

[73] Assignee: Motorola, Inc., Schaumburg, Ill.

[21] Appl. No.: 308,185

[22] Filed: Sep. 19, 1994

[51] Int. Cl.⁶ ............................................. H04B 14/06
[52] U.S. Cl. ................................. 375/244; 341/143
[58] Field of Search ................... 375/244, 243, 375/242, 316, 254, 346; 371/31, 37.1; 341/126, 143

[56] References Cited

U.S. PATENT DOCUMENTS

| | | | |
|---|---|---|---|
| 4,513,426 | 4/1985 | Jayant | 375/244 |
| 4,858,163 | 8/1989 | Boreland | 375/252 |
| 4,926,355 | 5/1990 | Boreland | 364/200 |
| 4,955,037 | 9/1990 | Anderson et al. | 375/244 |
| 5,319,573 | 6/1994 | Corleto et al. | 375/244 X |

OTHER PUBLICATIONS

Fukasawa et al, "Speech Coding Scheme for Personal Communications Under Radio Interference Noises" IEEE Vehicular Tech. 1994 Conf. pp. 1724–1727.

PIMRC '93, Fourth International Symposium on Personal Indoor, and Mobile Radio Communications, Pacifico Yokohama, Yokohama, Japan, Sep. 8–11, 1993.

"General Aspects of Digital Transmission Systems; Terminal Equipments," International Telecommunication Union CCITT, vol. III, Fascicle III.4, IXth Plenary Assembly, Melbourne, 14–25 Nov. 1988.

*Primary Examiner*—Tesfaldet Bocure
*Assistant Examiner*—Bryan Webster
*Attorney, Agent, or Firm*—Raymond J. Warren

[57] ABSTRACT

Noise in an ADPCM signal is muted or suppressed by modifying the magnitude of the ADPCM information during noisy conditions. In one method, the ADPCM data is changed to a predetermined magnitude value. In another method, the magnitude is reduced by a predetermined amount.

1 Claim, 3 Drawing Sheets

METHOD OF NOISE REDUCTION FOR AN ADPCM SIGNAL

TECHNICAL FIELD

This invention relates in general to noise reduction in general, and particularly to noise reduction of an ADPCM signal.

BACKGROUND

Adaptive differential pulse code modulation (ADPCM) is a digital coding scheme that has been adopted by the International Telecommunication Union specification G.721. The 32 Kbit/s ADPCM standard is a digital coding scheme in which a hexadecimal or four-bit binary code is utilized. The hexadecimal numbers represent signed magnitudes, either positive or negative, which correspond to the variation from the previous signal level. In effect, it is a quantitized difference signal in logarithmic domain. This differs from pulse code modulation (PCM) in which the coding is representative of the current signal level, independent of the previous value. The ADPCM value, therefore, meaning only in reference to the previous value. An ADPCM signal is subject to corruption, such as that which can occur on an RF transmission path.

Corrupted data can be determined in a number of ways, such as by phase error, illegal words, or a combination thereof. One known approach to muting noise is to substitute a zero magnitude change symbol, which in ADCPM is a hexadecimal "F," for the corrupted data. This approach will cause audio muting while the zero magnitude variation or hexadecimal "F" condition is maintained, but this approach introduces a transient type noise click subsequent in the decoded ADCPM signal. This is illustrated in an article entitled "Improved ADCPM Voice Transmission Employing Click Noise Detection Scheme for TDMA-TDD Systems," published in PIMRC '93, Fourth International Symposium on Personal Indoor, and Mobile Radio Communications, PACIFICO YOKOHAMA, Yokohama, Japan, Sep. 8–11, 1993. This particular article, which is incorporated herein by reference, proposes a noise suppression scheme to avoid this problem. Basically, the ADPCM signal data is converted to PCM and then the noise cancellation is accomplished by modifying the PCM signal. While this approach can be effectively utilized, it requires conversion of the signal to PCM from ADPCM. In some system applications, it may be desired to maintain the ADPCM signal for further transmission. Were this approach utilized, it would be necessary to first decode the ADPCM signal to a PCM signal, operate the noise suppression routine, and then re-encode the noise suppressed PCM signal to an ADPCM format prior to transmission. Such an approach obviously adds expense and complexity to a system. It would be desirable to noise cancel an ADPCM signal without decoding of the ADPCM signal and without introducing the severe click noises caused by substituting the hexadecimal "F" or zero magnitude change known approach.

SUMMARY OF THE INVENTION

Briefly, according to the invention, there is provided a method for suppressing noise in an ADPCM signal which operates by modification of the ADPCM receive data. When noise is detected, the magnitude of the ADPCM information is modified.

DETAILED DESCRIPTION OF THE PREFERRED EMBODIMENT

Figure 1:
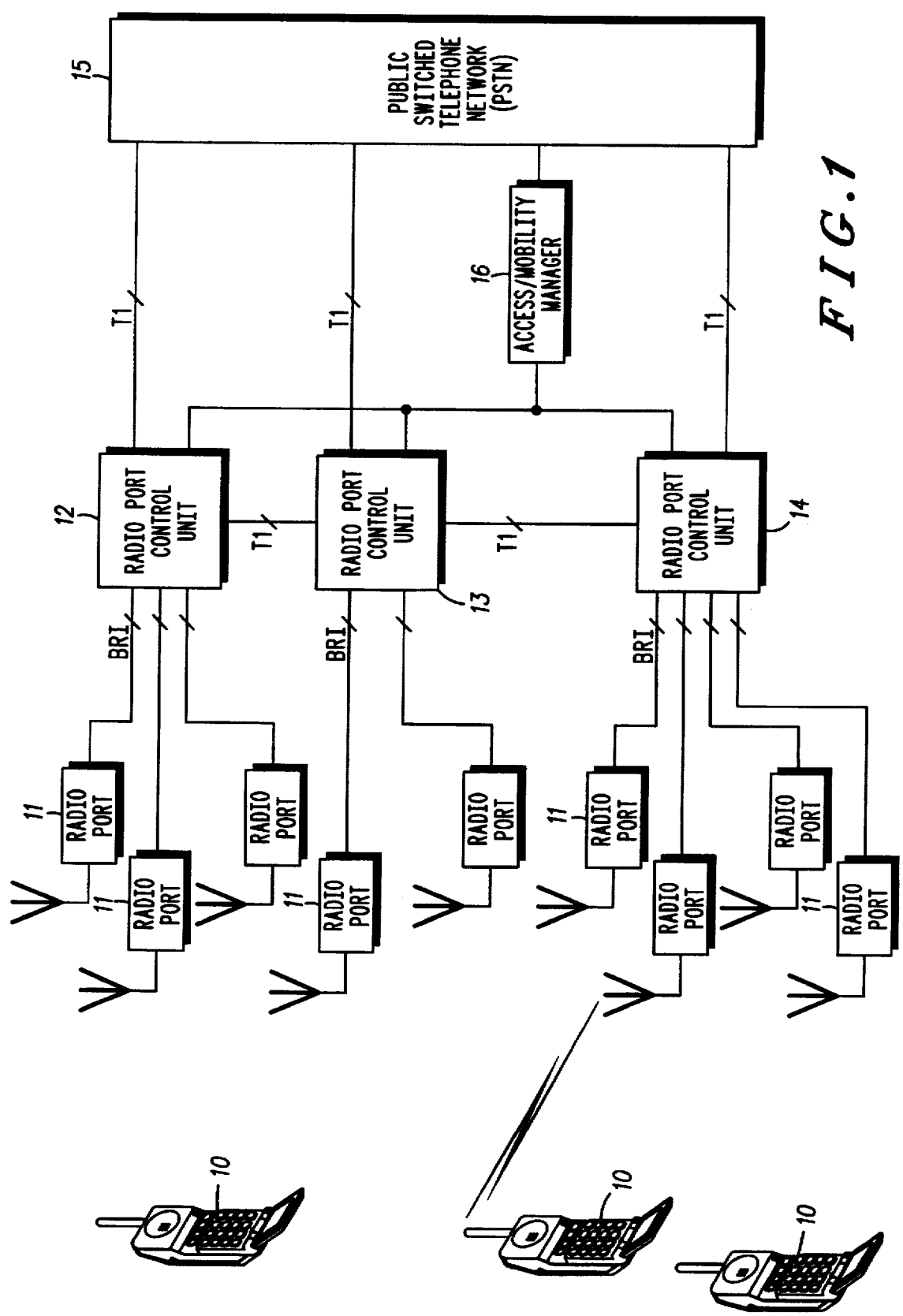
FIG. 1 is a block diagram of a radio system utilizing the present invention.

Referring now to the character references of the drawings, and first to FIG. 1, it will be understood that a two-way radio communication system such as a CT2 telephone system, is illustrated. In this system, a plurality of radios 10 can be utilized to communicate via the CT2 system. This system 32 Kbit/s ADPCM data transmissions occur between the radios 10 and any of a number of radio ports 11. The radio ports 11 are each connected to a radio port control unit, in this case 12, 13, and 14, which in turn, can communicate with the public switched telephone network (PSTN) 15. An access/mobility manager 16 is used to control each of the radio ports 12, 13, and 14, and the radio ports 12, 13, and 14 have T1 communication paths therebetween.

Figure 2:
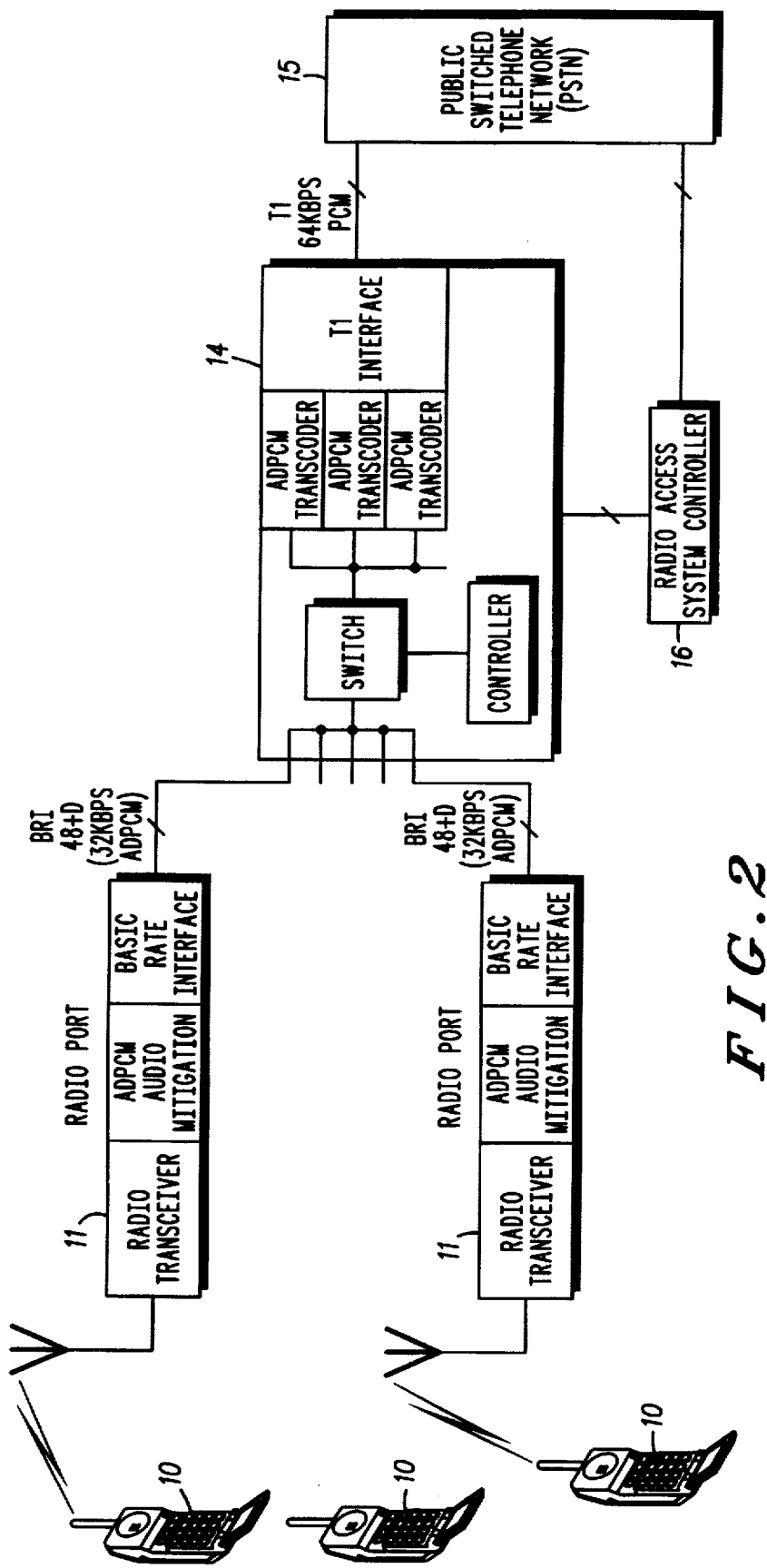
FIG. 2 is a block diagram of a portion of the radio system of FIG. 1.

Referring now to FIG. 2, a more detailed diagram shows two radio ports 11 connected to a typical radio port control unit, in this case 14, and the access/mobility manager 16 which can also be called a radio access system controller. Within the radio port control unit 14, individual radio port lines can be switched to various ADPCM transcoders and then interfaced via a T1 line to the public switched telephone network 15. As illustrated, it is only necessary to transcode or, in this case, decode, ADPCM information that is being connected to the public switched telephone network as 64 Kbit/s PCM. When the ADPCM information being received at one radio ports 11 is to be transmitted to a radio 10 at another radio port 11, the ADPCM data can be transferred to another radio port 11 on the radio port control unit 14, or to one of the other radio port control units 12 and 13 via a T1 line as ADPCM data. In such a scheme, it is necessary that the ADPCM audio mitigation or noise suppression be included, since the information does not exist as PCM until it has been decoded in the radio port control unit prior to interface to the PSTN 15.

Figure 3:
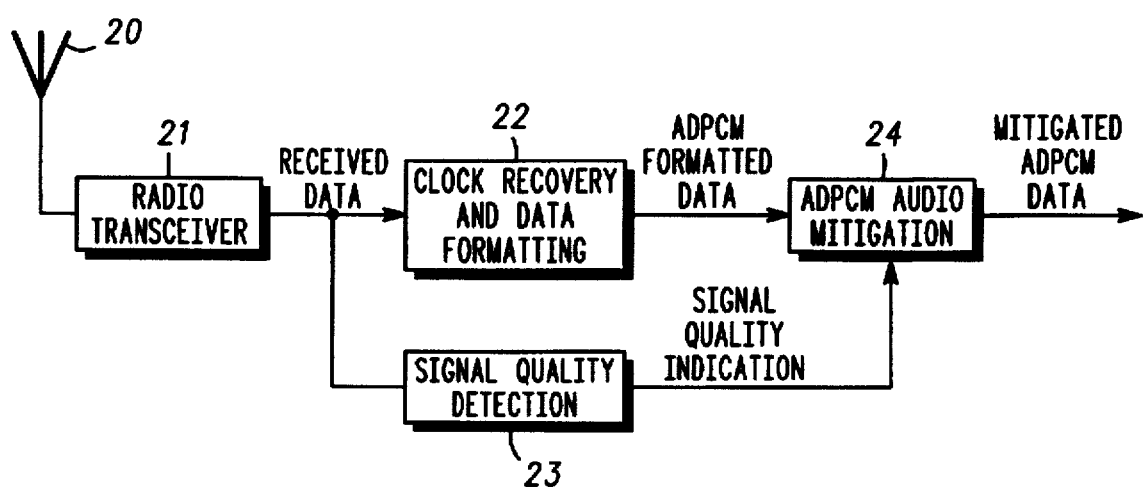
FIG. 3 is a block diagram of a radio port of FIG. 1.

The basic block diagram of a radio port 11 is illustrated in FIG. 3. It includes an antenna 20 that interfaces to a radio transceiver portion 21. The received data is demodulated and applied to a clock recovery and data formatting portion 22. The received data is also analyzed by a signal quality detection circuit 23 for phase error or the presence of illegal data. The formatted ADPCM data is applied to the ADPCM audio mitigation circuit 24 which can be a simple digital circuit or, if desired, a processor performing the audio mitigation of this invention. If the signal quality indication from the signal quality detection circuit 23 indicates noise on the signal, the ADPCM formatted data is modified in accordance with one of the preferred approaches below. When the signal quality if sufficient, the formatted ADPCM is merely passed through the ADPCM audio mitigation circuit 24.

As previously noted, a hexadecimal value of "F" corresponds to a zero magnitude differential. It should be noted that the hexadecimal value "zero" is not a valid ADPCM encoded nibble. If hexadecimal values "1" through "7" represent positive differentials from the predicted values, then hexadecimal values "8" through "E" represent negative differentials from the predicted values. In the preferred embodiment, all non-zero (hexadecimal "F" being zero) predicted differential values are adjusted to a predetermined value. In this case, all received hexadecimal values from "1"through "7" are replaced by hexadecimal "3" and the received hexadecimal values from "8" through "E" are replaced by hexadecimal "C," so that the received sequence, 21231FECAE1135D, would be modified to the series 33333FCCCC33333C.

In a second approach, the same ADPCM data, 21231FECAE1135D, would be modified by reducing the magnitude by one for both the positive and negative values. This is accomplished by subtracting one from the positive hexadecimal values which are values hexadecimal "1" through hexadecimal "7", and by increasing by 1 the negative hexadecimal values which are hexadecimal "8" through hexadecimal "E." Where the hexadecimal "1" is present, which represents the smallest positive differential, the hexadecimal "1" is converted to the hexadecimal value which corresponds to a zero variation, which is hexadecimal "F". The resulting mitigated audio would be hexadecimal values 1F12FFFDBFFF24E. Both of these approaches provide significant noise burst reduction over the prior approach of zeroing or "converting to hexadecimal F" all corrupted data. Changing the magnitude of received ADPCM data either to a predetermined constant magnitude or a reduced magnitude compared to that of the received noisy signal, improved audio output quality is obtained. This approach simplifies system construction, system issues and costs, since the noise suppression can be applied directly to the ADPCM data.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of noise suppression of an ADPCM signal comprising the steps of:

receiving a radio ADPCM voice signal transmission;

demodulating the radio ADPCM voice signal transmission to recover an ADPCM data;

detecting the presence of noise on the radio ADPCM voice signal transmission; and for a portion of the ADPCM data which includes noise, modifying a magnitude of the ADPCM data to mitigate the noise by substituting a predetermined magnitude value for the ADPCM data, the predetermined magnitude value being selected from a hexadecimal group consisting of the values "3" and "C", depending on the hexadecimal value of the received signal.

* * * * *